3,177,182
VULCANIZATION OF HALOGENATED
RUBBERY POLYMERS
Delmer L. Cottle, Highland Park, and Leon S. Minckler, Jr., Metuchen, N.J., assignors to Esso Research and Engineering Company, a corporation of Delaware
No Drawing. Filed Sept. 22, 1960, Ser. No. 57,608
14 Claims. (Cl. 260—79.5)

The present invention relates to improved vulcanization recipes for halogenated rubbery polymers. More particularly, it deals with curing halogenated isoolefin-multiolefin copolymers, e.g., halogenated butyl rubber at an accelerated rate by the use of thiohydantoin compounds as curatives.

Copolymers of the above general class, particularly where the copolymers contain about 85 to 99.5 weight percent of a $C_4$ to $C_8$ isoolefin, e.g., isobutylene, 3-methyl butene-1, with about 15 to 0.5 weight percent of a multiolefin of about 4 to 14 carbon atoms, e.g., myrcene, isoprene, butadiene, etc. are well known in the literature as "butyl rubber." For example, see "Synthetic Rubber" by G. S. Whitby (1954), and U.S. Patent 2,356,128 among many others. Halogenated butyl rubber-type copolymers are produced by halogenating butyl rubber in a manner which does not substantially degrade its molecular weight but however gives a rubbery product of substantially different properties than the unhalogenated material. Butyl rubber may be halogenated at temperatures of —50° to 200° C., preferably 0° to 100° C., at pressures of 0.5 to 900 p.s.i.a. with suitable halogenating agents such as gaseous chlorine, liquid bromine, iodine monochloride, etc. Halogenation may be accomplished in various ways. For example, the halogenation agent, e.g., chlorine, may be added to a solution of the copolymer in a suitable inert liquid organic solvent. The resulting halogenated polymer may be recovered by precipitation with a non-solvent at about 0 to 180° C., spray drying, or by flashing off the hydrocarbon solvent by injection into a hot water bath.

Preferably, the degree of halogenation is carefully regulated so that the halogenated copolymer contains at least 0.5 weight percent of combined halogen but not more than about one atom of combined fluorine or chlorine per double bond in the polymer, nor more than three atoms of combined bromine or iodine per double bond. A more detailed description of the formation of chlorinated butyl rubber may be had by referring to co-assigned Serial No. 512,182, filed May 31, 1955, now Patent No. 2,944,578.

The halogenated copolymer has a viscosity average molecular weight of about 100,000 to 2,000,000, and a mole percent unsaturation of between 0.1 to 20, preferably less than 10. As hereinafter employed in the specification, the term "halogenated butyl rubber" denotes the above described halogenated copolymers of a major portion of a $C_4$ to $C_8$ isoolefin and a minor portion of a $C_4$ to $C_{14}$ multiolefin.

Due to the relatively saturated nature of halogenated butyl rubber, one of the difficulties presented in its utilization has been its relatively low cure rate as compared with high unsaturation rubbers such as natural rubber. Relatively fast cures are desired in various applications for rubbery copolymers such as extrusion of tubes, conveyor belting, and wire coatings.

It has now been found that halogenated butyl rubber can be cured in a relatively short period of time to give vulcanizates of good physical properties by employing minor portions (based on rubbery polymer) of thiohydantoin compounds. Not only is the cure time reduced through the use of thiohydantoins as curatives, but additionally it has been found that the thiohydantoins give vulcanizates of improved physical properties when employed for relatively long curing periods, e.g., 45 minutes.

Curing may be effected under a broad range of temperatures, e.g., 200° to 450° F., preferably 250° to 350° F., as well as under various conditions, e.g., open steam heating, oven curing, during extrusion or molding, etc. The curing period may vary from about 2 minutes to several hours, it preferably being between about 5 to 60 min.—depending on temperature. Normally about 0.1 to 20, preferably 0.5 to 10, and particularly 1 to 8 weight percent based on halogenated polymer of a thiohydantoin compound is employed in the curing recipe. The thiohydantoin compound may be used as the sole curing agent. However, preferably it is employed in conjunction with metallic oxides such as zinc oxide, stannous oxide, magnesium oxide, etc. Such combinations of ingredients are particularly effective in obtaining fast, tight cures. In general, the presence of elemental sulfur as a curing agent is neither necessary nor desirable in the compositions of the present invention. Although a less desirable embodiment of the present invention, very small amounts, e.g., 0.1 to 1 weight percent of thiohydantoins may be used as vulcanization accelerators for conventional cure systems as opposed to being a prime curing agent itself.

Vulcanization recipes prepared in accordance with the present invention may contain various additional materials such as carbon black, mineral fillers, pigments, antioxidants, extender oils, anti-tack agents, etc. If desired, blends of halogenated butyl and other rubbers, e.g., natural rubber, neoprene, butadiene-styrene polymers, etc., may be cured with the thiohydantoin compounds of the present invention.

It is noted that although recently it has been suggested that various amine compounds may be used as curing agents for halogenated butyl rubber, it has been found that the thiohydantoin compounds will give fast cures, whereas simply employing hydantoin is not effective in yielding this very desirable result.

Thiohydantoin compounds suitable for the practice of the present invention may be represented by the following generic formulas:

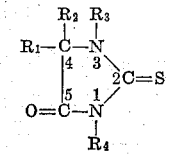

and

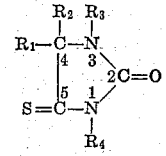

wherein $R_1$, $R_2$, $R_3$ and $R_4$ are selected from the group consisting of: (a) hydrogen, (b) $C_1$ to $C_{20}$ alkyls, (c) $C_1$ to $C_{20}$ aryl, and (d) $C_1$ to $C_{20}$ acyls. Examples of suitable compounds are as follows:

2-thiohydantoin, 5-thiohydantoin, 2,5-dithiohydantoin.
1-ethyl-2-thiohydantoin, 3-decyl-5-thiohydantoin, 4-isopropyl-1-octadecyl-2 - thiohydantoin, 4,4-di-n-octyl-5-thiohydantoin.
3 - phenyl - 2 - thiohydantoin, 4 - naphthyl - 1 - benzyl-5-thiohydantoin, 1-(10-p-tolyltetradecyl)-5-thiohydantoin, 4-phenylethyl-4-naphthyl-2-thiohydantoin.

3-acetyl-5-thiohydantoin, 4-n-butyryl-2-thiohydantoin, 1-decanoyl-2-thiohydantoin, 3-hexadecanoyl-2-thiohydantoin.

The term "thiohydantoin compound" as employed in this specification, denotes thiohydantoin and its derivatives, as is illustrated by the above structural formulas.

It is to be noted that thiohydantoin compounds will not cure unhalogenated butyl rubber, whereas they unexpectedly give very good cures when used to vulcanize halogenated butyl rubber.

Various aspects and modifications of the present invention will be made more clearly apparent by reference to the following description and the accompanying examples.

EXAMPLES 1 TO 4

A typical halogenated butyl rubber hereinafter denoted "chlorinated butyl rubber A" was compounded with various thiohydantoin compounds as well as hydantoin in accordance with the recipes shown in Table I. The various ingredients were mixed on a rubber mill in the conventional manner, the proportions in parts by weight being shown in Table I. Portions of the recipes indicated were then vulcanized for 15 minutes, and for 45 minutes at a temperature level of 307° F., the vulcanizates formed having the physical properties indicated.

Chlorinated butyl rubber A contained 2 weight percent isoprene, 98 weight percent isobutylene, 1.3 weight percent chlorine, and had a mole percent unsaturation of 0.8, a viscosity average molecular weight of 375,000, and a Mooney viscosity of 54 (8 minutes at 212° F.).

Table I

| Compound | Sample | | | | |
|---|---|---|---|---|---|
| | A | B | C | D | E |
| Chlorinated butyl rubber | 100 | 100 | 100 | 100 | 100 |
| Carbon Black (Philblack-O) | 50 | 50 | 50 | 50 | 50 |
| Stearic Acid | 1.0 | 1.0 | 1.0 | 1.0 | 1.0 |
| Zinc Oxide | 5.0 | 5.0 | 5.0 | 5.0 | 5.0 |
| 2-thiohydantoin | | 5.0 | | | |
| 1-acetyl-2-thiohydantoin | | | 5.0 | | |
| 5-(2-hydroxybenzal)-2-thiohydantoin | | | | 5.0 | |
| Hydantoin | | | | | 5.0 |
| Cured 15 Minutes at 307° F.: | | | | | |
| Modulus, p.s.i./300% | 285 | 1,300 | | 2,015 | No cure. |
| Tensile, p.s.i. | 450 | 1,370 | 2,020 | 2,175 | No cure. |
| Elongation, percent | 700 | 315 | 265 | 320 | No cure. |
| Cured 45 Minutes at 307° F.: | | | | | |
| Modulus, p.s.i./300% | 1,465 | | | | 340 |
| Tensile, p.s.i. | 2,050 | 2,000 | 2,095 | 2,240 | 385 |
| Elongation, percent | 410 | 280 | 215 | 295 | 505 |
| Goodrich Flexometer (45 Minutes at 307° F.): | | | | | |
| Dynamic Drift, percent | | 1.4 | 1.3 | 0.9 | |
| Final Dynamic Comp., percent | failed | 5.2 | −1.2 | 2.6 | |
| Compression Set, percent | | 5.3 | 2.5 | 1.9 | |
| Maximum Temperature Rise, ° C. | | 34 | 26 | 37 | |
| To Maximum Temperature, Min. | | 14 | 14 | 16 | |
| Shore A Hardness | 55 | 60 | 66 | 60 | |

As shown in Table I, curing recipes containing various thiohydantoin compounds, e.g. thiohydantoin, acetyl-thiohydantoin, hydroxy benzal thiohydantoin, gave vulcanizates of good properties for curing periods of 15 minutes, whereas a conventional zinc oxide cure system (Sample A) gave a vulcanizate of poor properties. Further, curing for 45 minutes at 307° F. by the use of thiohydantoins gave vulcanizates of somewhat better physical properties and substantially better dynamic properties than a conventional cure system.

As indicated by Sample E, the use of thiohydantoins gives markedly superior vulcanizates than would be obtained by the use of hydantoin as a curing agent.

EXAMPLES 5 TO 9

A typical halogenated butyl rubber hereinafter denoted "brominated butyl rubber B" was compounded with various thiohydantoin compounds as well as hydantoin in accordance with the recipes shown in Table II. The various ingredients were mixed on a rubber mill in the conventional manner, the proportions in parts by weight being shown in Table II. The recipes indicated were then vulcanized for 15 minutes and for 45 minutes at a temperature level of 307° F., the vulcanizates formed having the physical properties indicated.

Brominated butyl rubber B contained 2 weight percent isoprene, 98 weight percent isobutylene, 2.3 weight percent bromine, and had a mole percent unsaturation of 0.7, a viscosity average molecular weight of 400,000, and a Mooney viscosity of 58 (8 minutes at 212° F.).

Table II

| Compound | 5 | 6 | 7 | 8 | 9 | 10 |
|---|---|---|---|---|---|---|
| Brominated Butyl Rubber B | 100 | 100 | 100 | 100 | 100 | 100 |
| Carbon Black (Philblack-O) | 50 | 50 | 50 | 50 | 50 | 50 |
| Stearic Acid | 1 | 1 | 1 | 1 | 1 | 1 |
| Zinc Oxide | | 5 | | 5 | | 5 |
| 2-thiohydantoin | 5 | 2 | | | | |
| 1-acetyl-2-thiohydantoin | | | 5 | 2 | | |
| 5-(2-hydroxybenzal)-2-thiohydantoin | | | | | 5 | 2 |
| Cured 15 Minutes at 307° F.: | | | | | | |
| Modulus, p.s.i./300% | 225 | 2,260 | 130 | 2,280 | | 1,715 |
| Tensile, p.s.i. | 490 | 2,700 | 335 | 2,280 | 2,225 | 2,910 |
| Elongation, percent | 455 | 315 | 695 | 300 | 725 | 405 |
| Cured 45 Minutes at 307° F.: | | | | | | |
| Modulus, p.s.i./300% | 645 | 2,565 | 165 | 2,910 | | 1,900 |
| Tensile, p.s.i. | 895 | 2,735 | 520 | 2,910 | | 2,780 |
| Elongation, percent | 400 | 335 | 600 | 300 | | 405 |

As shown in Table II, various thiohydantoin compounds can be used to cure brominated butyl rubber, and give vulcanizates of good properties. The combination of a thiohydantoin compound and zinc oxide is particularly preferred to obtain high quality vulcanizates in short curing periods, e.g. 15 minutes.

Having described the present invention, that which is sought to be protected is set forth in the following claims.

What is claimed is:

1. A composition comprising a halogenated rubbery copolymer of a major proportion of a $C_4$ to $C_8$ isoolefin and a minor proportion of a $C_4$ to $C_{14}$ multiolefin, and a minor proportion based on rubbery copolymer of a thiohydantoin compound with no elemental sulfur being present, said thiohydantoin compound being represented by one of the following generic formulas:

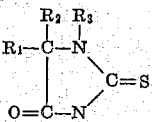

and

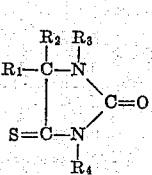

wherein $R_1$, $R_2$, $R_3$ and $R_4$ are selected from the group consisting of: (a) hydrogen, (b) $C_1$ to $C_{20}$ alkyls, (c) $C_1$ to $C_{20}$ aryl, and (d) $C_1$ to $C_{20}$ acyls.

2. The composition of claim 1 wherein said thiohydantoin compound comprises 0.5 to 10 weight percent based on copolymer of said composition.

3. A composition comprising a halogenated rubbery copolymer of about 85 to 99.5 weight percent of a $C_4$ to $C_8$ isoolefin and about 15 to 0.5 weight percent of a $C_4$ to $C_{14}$ multiolefin, and 0.1 to 20 weight percent based on copolymer of a thiohydantoin compound with no elemental sulfur being present, said thiohydantoin compound being represented by one of the following generic formulas:

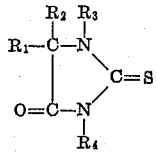

and

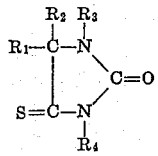

wherein $R_1$, $R_2$, $R_3$ and $R_4$ are selected from the group consisting of: (a) hydrogen, (b) $C_1$ to $C_{20}$ alkyls, (c) $C_1$ to $C_{20}$ aryl, and (d) $C_1$ to $C_{20}$ acyls.

4. The composition of claim 3 which also contains a metallic oxide.

5. A composition comprising a halogenated rubbery copolymer of about 85 to 99.5 weight percent of a $C_4$ to $C_8$ isoolefin and about 15 to 0.5 weight percent of a $C_4$ to $C_{14}$ multiolefin, said copolymer containing at least 0.5 weight percent halogen but no more than 3 atoms of combined halogen per double bond in the polymer, and 0.1 to 20 weight percent based on copolymer of a thiohydantoin compound with no elemental sulfur being present, said thiohydantoin compound being represented by one of the following generic formulas:

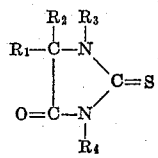

and

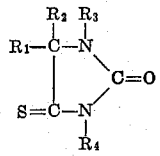

wherein $R_1$, $R_2$, $R_3$ and $R_4$ are selected from the group consisting of: (a) hydrogen, (b) $C_1$ to $C_{20}$ alkyls, (c) $C_1$ to $C_{20}$ aryl, and (d) $C_1$ to $C_{20}$ acyls.

6. The composition of claim 5 wherein said copolymer contains a halogen selected from the group consisting of chlorine and bromine.

7. The composition of claim 5 wherein said thiohydantoin compound is 2-thiohydantoin.

8. The composition of claim 5 wherein said thiohydantoin compound is 1-acetyl-2-thiohydantoin.

9. The composition of claim 5 wherein said thiohydantoin compound is 5-(2-hydroxyl benzal)-2-thiohydantoin.

10. A method of curing a halogenated rubbery copolymer of about 85 to 99.5 weight percent of a $C_4$ to $C_8$ isoolefin and about 15 to 0.5 weight percent of a $C_4$ to $C_{14}$ multiolefin, said copolymer containing at least 0.5 weight percent halogen but no more than 3 atoms of combined halogen per double bond in the polymer which comprises heating said copolymer at a temperature in the range of 200° to 450° F. in the absence of elemental sulfur with from 0.1 to 20 weight percent based on copolymer of a thiohydantoin compound represented by one of the following generic formulas:

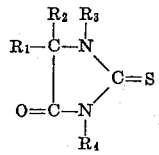

and

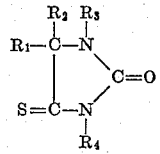

wherein $R_1$, $R_2$, $R_3$ and $R_4$ are selected from the group consisting of: (a) hydrogen, (b) $C_1$ to $C_{20}$ alkyls, (c) $C_1$ to $C_{20}$ aryl, and (d) $C_1$ to $C_{20}$ acyls.

11. The process of claim 10 wherein said copolymer contains a halogen selected from the group consisting of chlorine and bromine.

12. The process of claim 10 wherein said thiohydantoin compound is 2-thiohydantoin.

13. The process of claim 10 wherein said thiohydantoin compound is 1-acetyl-2-thiohydantoin.

14. The process of claim 10 wherein said thiohydantoin compound is 5-(2-hydroxyl benzal)-2-thiohydantoin.

References Cited by the Examiner

UNITED STATES PATENTS 2,649,459   8/53   Brooker et al. _____ 260—309.5
2,948,709   8/60   Kuntz _____ 260—85.3

LEON J. BERCOVITZ, *Primary Examiner.*

H. N. BURSTEIN, JOSEPH L. SCHOFER,
*Examiners.*